United States Patent
Blateri

(10) Patent No.: US 7,143,988 B2
(45) Date of Patent: Dec. 5, 2006

(54) APPARATUS AND METHOD FOR MOUNTING A FIXTURE

(75) Inventor: Frank Blateri, Coppell, TX (US)

(73) Assignee: Diani, LLC., Dallas, TX (US)

( * ) Notice: Subject to any disclaimer, the term of this patent is extended or adjusted under 35 U.S.C. 154(b) by 134 days.

(21) Appl. No.: 10/865,309

(22) Filed: Jun. 10, 2004

(65) Prior Publication Data

US 2005/0274864 A1   Dec. 15, 2005

(51) Int. Cl.
*F16M 13/00* (2006.01)

(52) U.S. Cl. ........................... 248/343; 403/362

(58) Field of Classification Search ............... 248/343; 403/362, 361, 286, 292, 293, 306
See application file for complete search history.

(56) References Cited

U.S. PATENT DOCUMENTS

| 413,730 | A | * | 10/1889 | Palmer | 135/160 |
|---|---|---|---|---|---|
| 777,215 | A | * | 12/1904 | Meston | 174/138 D |
| 1,073,614 | A | * | 9/1913 | McDearmind | 405/251 |
| 4,810,207 | A | * | 3/1989 | Butterfield | 439/529 |
| 4,836,485 | A | * | 6/1989 | Cooper | 248/278.1 |
| 4,960,009 | A | * | 10/1990 | Schultz et al. | 74/473.29 |
| 5,020,934 | A | * | 6/1991 | Floren et al. | 403/306 |
| 5,090,654 | A | * | 2/1992 | Ridings et al. | 248/343 |
| 6,488,439 | B1 | * | 12/2002 | Lackey, Sr. | 403/305 |

FOREIGN PATENT DOCUMENTS

GB    2119103 A    * 11/1983

* cited by examiner

*Primary Examiner*—Korie Chan
(74) *Attorney, Agent, or Firm*—Haynes and Boone, LLP

(57) ABSTRACT

An apparatus and method for mounting a fixture to a ceiling according to which an adapter is provided that receives two downrods, one of which is connected to the ceiling and the other of which is connected to the fixture.

6 Claims, 7 Drawing Sheets

APPARATUS AND METHOD FOR MOUNTING A FIXTURE

BACKGROUND

This invention relates to an apparatus for mounting a fixture to a ceiling.

Various ceiling-mountable fixtures, such as fans, lights (semiflushes, chandeliers, pedants, etc,), loudspeakers, monitors, video cameras, televisions, and the like, are usually connected to an electrical box, terminal, or the like, at the ceiling. When it is desired to mount the fixture in a spaced relation to the ceiling, a downrod is usually connected between the electrical box or terminal and the fixture. In some installations it would be desirable to connect a second, or extension, downrod to the original downrod to lower the fixture a distance greater than permitted by the original downrod. However, there usually is no simple and quick way to connect the corresponding ends of the two downrods. To compound this problem the extension downrod, which is often obtained or purchased separately from the original downrod, often has a different diameter than the original downrod. Further the extension downrod may sometimes be adapted for a threaded connection, while the original downrod is not.

Therefore, what is needed is an adapter to enable a downrod extension to be connected to a downrod quickly and easily.

DETAILED DESCRIPTION

Figure 1:
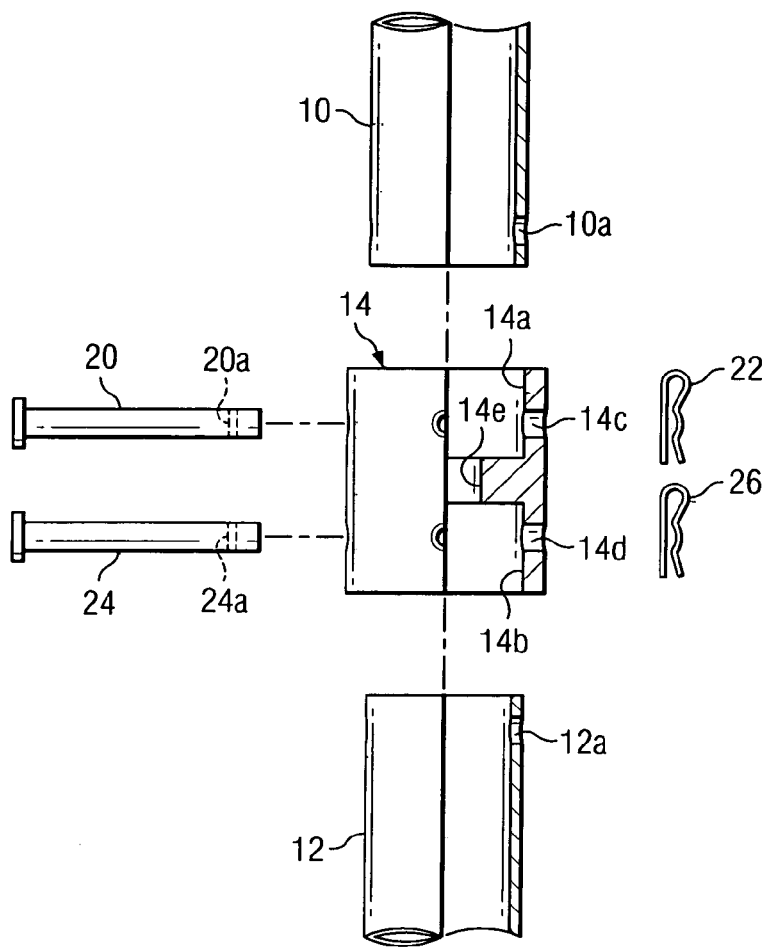
FIG. 1 is an exploded, partial sectional/partial elevational view of an embodiment of the present invention.

Referring to FIG. 1 of the drawings, the reference 10 refers, in general, to a downrod that is to be connected to a downrod 12. It is understood that one of the downrods 10 or 12 is designed to connect a fixture, such as a ceiling fan, light fixture, or the like, in a spaced relation to a ceiling. In this case, the other downrod 10 or 12 would be an extension downrod that connects to the original downrod to lower the fixture a distance greater than permitted by the original downrod.

For the purpose of example, it will be assumed that the upper end of the downrod 10, as viewed in FIG. 1, is adapted for connection to a conventional electrical box or terminal, or the like, (not shown), mounted in a ceiling and that the upper end of the downrod 12 is to be connected to the lower end of the downrod 10 in a manner to be described. Also, the lower end of the downrod 12 would be connected to the fixture, such as a ceiling fan, and electrical conductors from the electrical box, or terminal, would be threaded through the downrods 10 and 12 and connected to the fixture, in a conventional manner. Thus, when so connected, the downrod 12 permits the fixture to be mounted a greater distance from the ceiling than permitted by the downrod 10.

The downrod 10 is tubular and has two aligned, diametrically opposed, transverse openings extending through its wall near its lower end, with one of the openings being referred to by the reference numeral 10a. The downrod 12 is also tubular and has two aligned, diametrically opposed, transverse openings extending through its wall near its upper end, with one of the openings being shown by the reference numeral 12a. For the purposes of this example, it will be assumed that the outer diameters of the downrods 10 and 12 are equal.

An adapter 14 connects the downrods 10 and 12 and is formed by a solid cylindrical member having two counterbores 14a and 14b formed in its respective ends. The wall of the adapter 14 defining the counterbore 14a has two aligned, diametrically opposed, openings extending therethrough, with one of the openings being shown by the reference numeral 14c. Similarly, the wall of the adapter 14 defining the counterbore 14b also has two aligned, diametrically opposed, openings extending therethrough, with one of the openings being shown by the reference numeral 14d.

The diameter of the counterbore 14a of the adapter 14 corresponds to the outer diameter of the downrod 10 so that the lower end portion of the downrod 10 can be inserted in the counterbore 14a with minimum clearance. The depth of the counterbore 14a and the location of the openings 10a on the downrod 10 are such that when the end of the downrod abuts the bottom of the counterbore, the openings 10a and 14c are vertically aligned. Thus, the adapter 14 can be rotated relative to the downrod 10 until the openings 14c align with the openings 10a. A bolt 20 is then inserted in the aligned openings 14c and 10a to lock the downrod 10 to the adapter 14, and a lock pin 22 is inserted through a transverse opening 20a formed in the bolt to retain the bolt in the locking position.

Similarly, the diameter of the counterbore 14b of the adapter 14 corresponds to the outer diameter of the downrod 12 so that the upper end portion of the downrod 12 can be inserted in the counterbore 14b with minimum clearance. After this insertion, the adapter 14 is rotated relative to the downrod 12 until the openings 14d align with the openings 12a. A bolt 24 is then inserted in the aligned openings 14d and 12a to lock the downrod 12 to the adapter 14, and a lock pin 26 is inserted through a transverse opening 24a formed in the bolt to retain the bolt in the locking position.

A through bore 14e is formed through the adapter 14 for reasons that will be described.

To insure the stability of the above connection of the downrod 10 to the adapter 14, a set screw 28a can be provided that extends perpendicular to the bolt 20 and through an opening in the adapter 14, and engages the downrod. Also, a set screw 28b can be provided that extends perpendicular to the bolt 24 and through another opening in the adapter 14 and engages the downrod 12.

To mount the fixture to the ceiling, the upper end of the downrod 10 is connected to the electrical box, or terminal, in the ceiling, and the lower end of the downrod 10 is connected to the upper end of the downrod 12 by the adapter 14 in the manner described above. Electrical conductors from the electrical box, or terminal, are then threaded through the downrod 10, through the counterbores 14a and 14d and the through bore 14e of the adapter 14, and through the downrod 12 and are connected to the fixture, and the lower end of the downrod 12 is then connected to the fixture.

Alternatively, the lower end of the downrod 12 is connected to the fixture, and the upper end of the downrod 12 is connected to the lower end of the downrod 10 by the adapter 14 in the manner described above. Electrical conductors from the fixture are then threaded through the downrod 12, the adapter 14 and the downrod 10 and are connected to the electrical box or terminal at the ceiling, and the upper end of the downrod 10 is then connected to the electrical box, or fixture.

Figure 2:
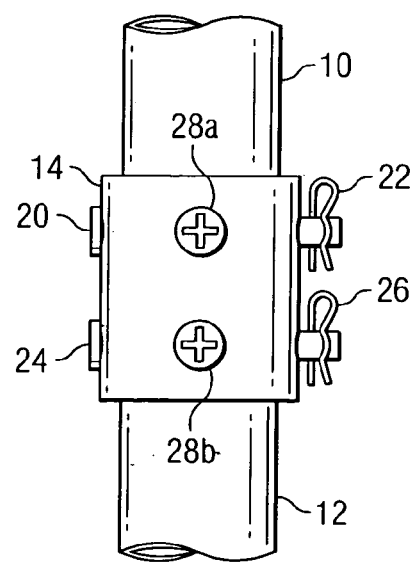
FIG. 2 is an elevational view depicting the components of FIG. 1 in an assembled condition.
Figure 3:
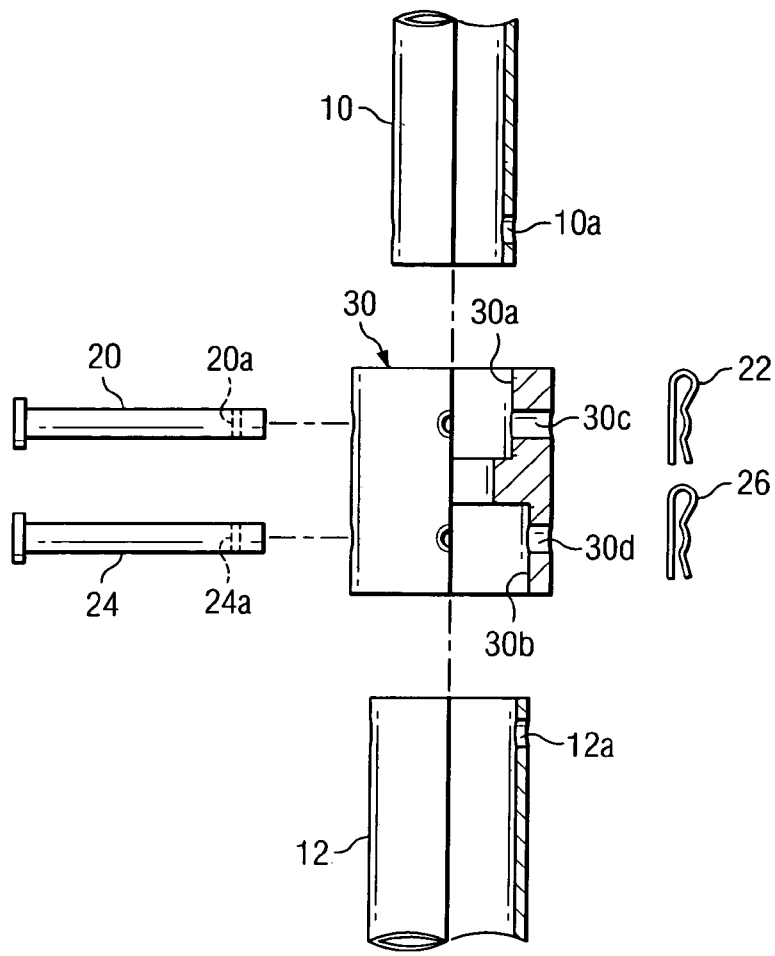
FIG. 3 is an exploded, partial sectional/partial elevational view of an alternate embodiment of the present invention.
Figure 4:
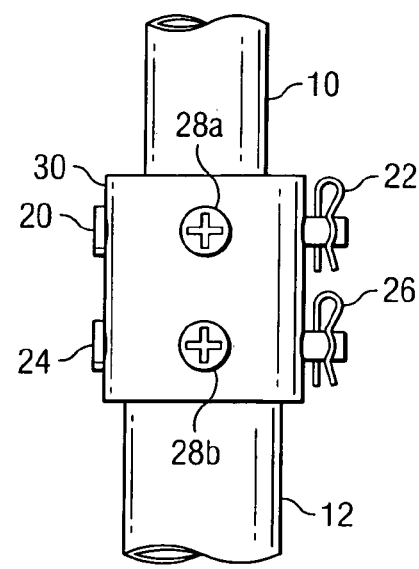
FIG. 4 is an elevational view of the embodiment of FIG. 3, depicting the components of FIG. 3 in an assembled condition.

The embodiment of FIGS. 3 and 4 is similar to that of FIGS. 1 and 2, and identical components are given the same reference numerals. For the purposes of this example, it will be assumed that the outer diameter of the downrod 10 is less than that of the downrod 12.

An adapter 30 connects the downrods 10 and 12 and is formed by a solid cylindrical member having two counterbores 30a and 30b formed in its respective ends. The wall of the adapter 30 defining the counterbore 30a has two aligned, diametrically opposed, openings extending therethrough, with one of the openings being shown by the reference numeral 30c. Similarly, the wall of the adapter 30 defining the counterbore 30b also has two aligned, diametrically opposed, openings extending therethrough, with one of the openings being shown by the reference numeral 30d.

The diameter of the counterbore 30a of the adapter 30 corresponds to the outer diameter of the downrod 10 so that the lower end portion of the downrod 10 can be inserted in the counterbore 30a with minimum clearance. After this insertion, the adapter 30 is rotated relative to the downrod 10 until the openings 30c align with the openings 10a. The bolt 20 (described in the previous embodiment) is then inserted in the aligned openings 30c and 10a to lock the downrod 10 to the adapter 30, and the lock pin 22 is inserted through a transverse opening 20a formed in the bolt to retain the bolt in the locking position.

Similarly, the diameter of the counterbore 30b of the adapter 30 corresponds to the outer diameter of the downrod 12 so that the upper end portion of the downrod 12 can be inserted in the counterbore 30b with minimum clearance. After this insertion, the adapter 30 is rotated relative to the downrod 12 until the openings 30d align with the openings 12a. The bolt 24 is then inserted in the aligned openings 30d and 12a to lock the downrod 12 to the adapter 30, and the lock pin 26 is inserted through a transverse opening 24a formed in the bolt to retain the bolt in the locking position.

As in the previous embodiment, the set screw 28a extends through an opening in the adapter 30, and engages the downrod 10. Also, the set screw 28b extends through another opening in the adapter 30 and engages the downrod 12.

The fixture is connected to the ceiling by the downrods 10 and 12 and the adapter 30 in the same manner as discussed in connection with the embodiment of FIGS. 1 and 2.

Figure 5:
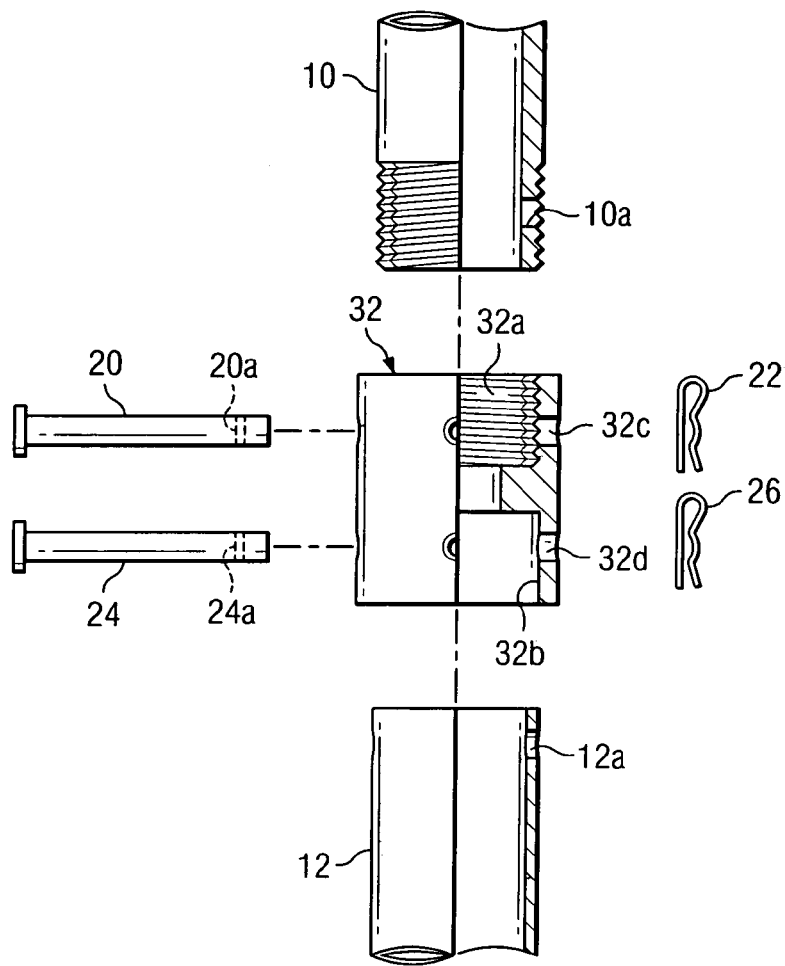
FIG. 5 is an exploded, partial sectional/partial elevational view of an alternate embodiment of the present invention.
Figure 6:
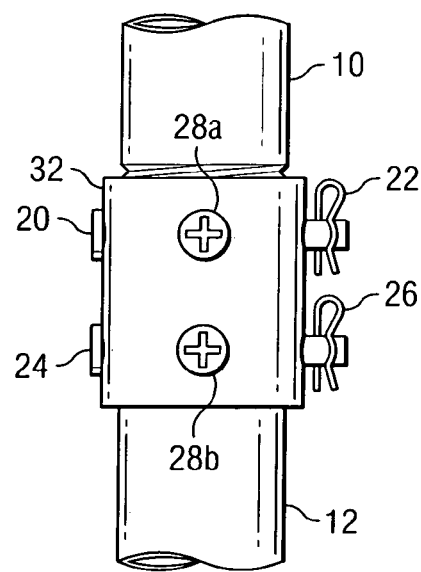
FIG. 6 is an elevational view of the embodiment of FIG. 5, depicting the components of FIG. 5 in an assembled condition.

The embodiment of FIGS. 5 and 6 is similar to that of the previous embodiments, and identical components are given the same reference numerals. For the purposes of this example, it will be assumed that the outer diameter of the downrod 10 is the same as that of the downrod 12 and that the lower end portion of the downrod 10 is externally threaded.

An adapter 32 connects the downrods 10 and 12 and is formed by a solid cylindrical member having two counterbores 32a and 32b formed in its respective ends. The counterbore 32a is internally threaded to receive the externally threaded, lower end portion of the downrod 10.

The wall of the adapter 32 defining the counterbore 32a has two aligned, diametrically opposed, openings extending therethrough, with one of the openings being shown by the reference numeral 32c. Similarly, the wall of the adapter 32 defining the counterbore 32b also has two aligned, diametrically opposed, openings extending therethrough, with one of the openings being shown by the reference numeral 32d.

The diameter of the counterbore 32a of the adapter 32 corresponds to the outer diameter of the downrod 10 so that the lower end portion of the downrod 10 can be threadedly engaged with the internally threaded counterbore 32a by rotating the adapter and the downrod relative to each other. After a sufficient threaded engagement has been established, the relative rotation is continued until the openings 32c align with the openings 10a. The bolt 20 (described in the embodiment of FIGS. 1 and 2) is then inserted in the aligned openings 32c and 10a to lock the downrod 10 to the adapter 32, and the lock pin 22 is inserted through a transverse opening 20a formed in the bolt to retain the bolt in the locking position.

The diameter of the counterbore 32b of the adapter 32 corresponds to the outer diameter of the downrod 12 so that the upper end portion of the downrod 12 can be inserted in the counterbore 32b with minimum clearance. After this insertion, the adapter 32 is rotated relative to the downrod 12 until the openings 32d align with the openings 12a. The bolt 24 is then inserted in the aligned openings 32d and 12a to lock the downrod 12 to the adapter 32, and the lock pin 26 is inserted through a transverse opening 24a formed in the bolt to retain the bolt in the locking position.

As in the previous embodiments, the set screw 28a extends through an opening in the adapter 32, and engages the downrod 10. Also, the set screw 28b extends through another opening in the adapter 32 and engages the downrod 12.

The fixture is connected to the ceiling by the downrods 10 and 12 and the adapter 32 in the same manner as discussed in connection with the embodiment of FIGS. 1 and 2.

Figure 7:
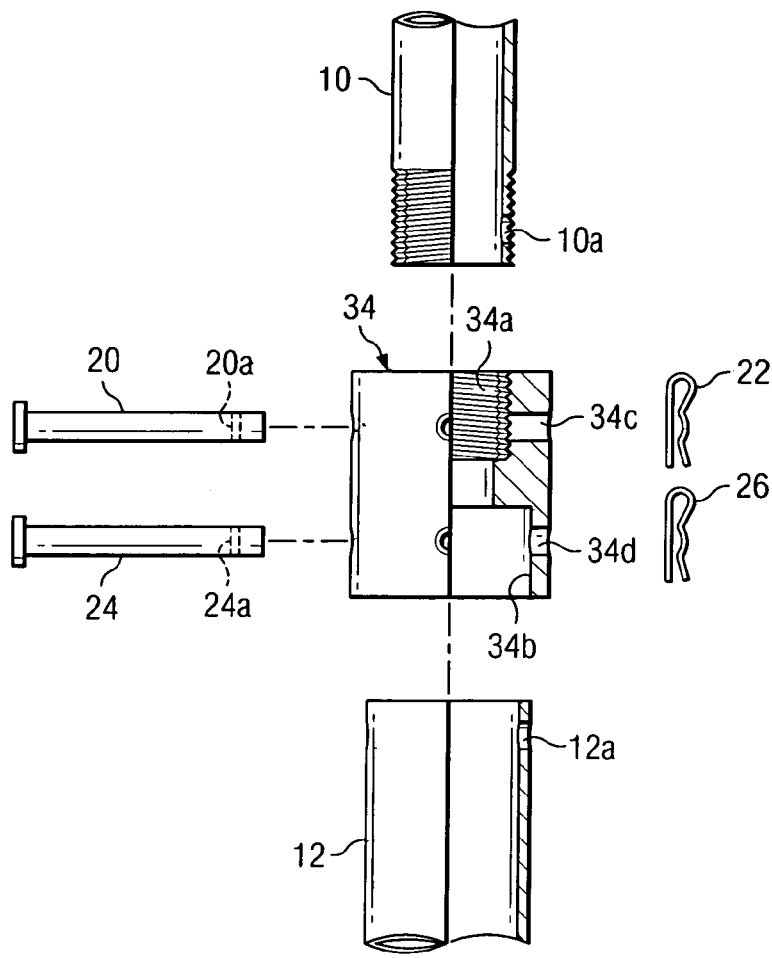
FIG. 7 is an exploded, partial sectional/partial elevational view of an alternate embodiment of the present invention.
Figure 8:
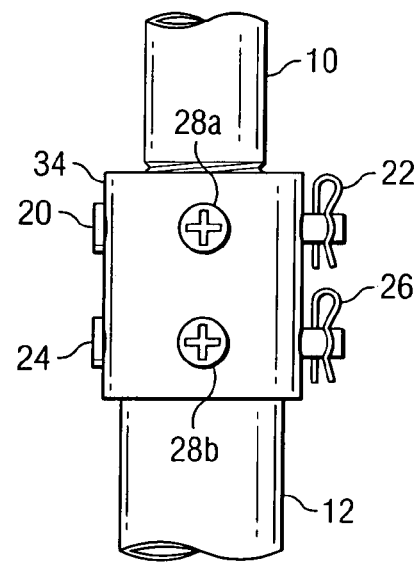
FIG. 8 is an elevational view of the embodiment of FIG. 7, depicting the components of FIG. 7 in an assembled condition.

The embodiment of FIGS. 7 and 8 is similar to that of the previous embodiments, and identical components are given the same reference numerals. For the purposes of this example, it will be assumed that the outer diameter of the downrod 10 is less than that of the downrod 12 and that the lower end portion of the downrod 10 is externally threaded.

An adapter 34 connects the downrods 10 and 12 and is formed by a solid cylindrical member having two counterbores 34a and 34b formed in its respective ends. The counterbore 34a is internally threaded to receive the externally threaded, lower end portion of the downrod 10.

The wall of the adapter 34 defining the counterbore 34a has two aligned, diametrically opposed, openings extending therethrough, with one of the openings being shown by the reference numeral 34c. Similarly, the wall of the adapter 34 defining the counterbore 34b also has two aligned, diametrically opposed, openings extending therethrough, with one of the openings being shown by the reference numeral 34d.

The diameter of the counterbore 34a of the adapter 34 corresponds to the outer diameter of the downrod 10 so that the lower end portion of the downrod 10 can be threadedly engaged with the internally threaded counterbore 34a by rotating the adapter and the downrod relative to each other. After a sufficient threaded engagement has been established, the relative rotation is continued until the openings 34c align with the openings 10a. The bolt 20 (described in the embodiment of FIGS. 1 and 2) is then inserted in the aligned openings 34c and 10a to lock the downrod 10 to the adapter 34, and the lock pin 22 is inserted through a transverse opening 20a formed in the bolt to retain the bolt in the locking position.

The diameter of the counterbore 34b of the adapter 34 corresponds the outer diameter of the downrod 12 so that the upper end portion of the downrod 12 can be inserted in the counterbore 34b with minimum clearance. After this insertion, the adapter 34 is rotated relative to the downrod 12 until the openings 34d align with the openings 12a. The bolt 24 is then inserted in the aligned openings 34d and 12a to lock the downrod 12 to the adapter 34, and the lock pin 26 is inserted through a transverse opening 24a formed in the bolt to retain the bolt in the locking position.

As in the previous embodiments, the set screw 28a extends through an opening in the adapter 34, and engages the downrod 10. Also, the set screw 28b extends through another opening in the adapter 34 and engages the downrod 12.

The fixture is connected to the ceiling by the downrods 10 and 12 and the adapter 34 in the same manner as discussed in connection with the embodiment of FIGS. 1 and 2.

Figure 9:
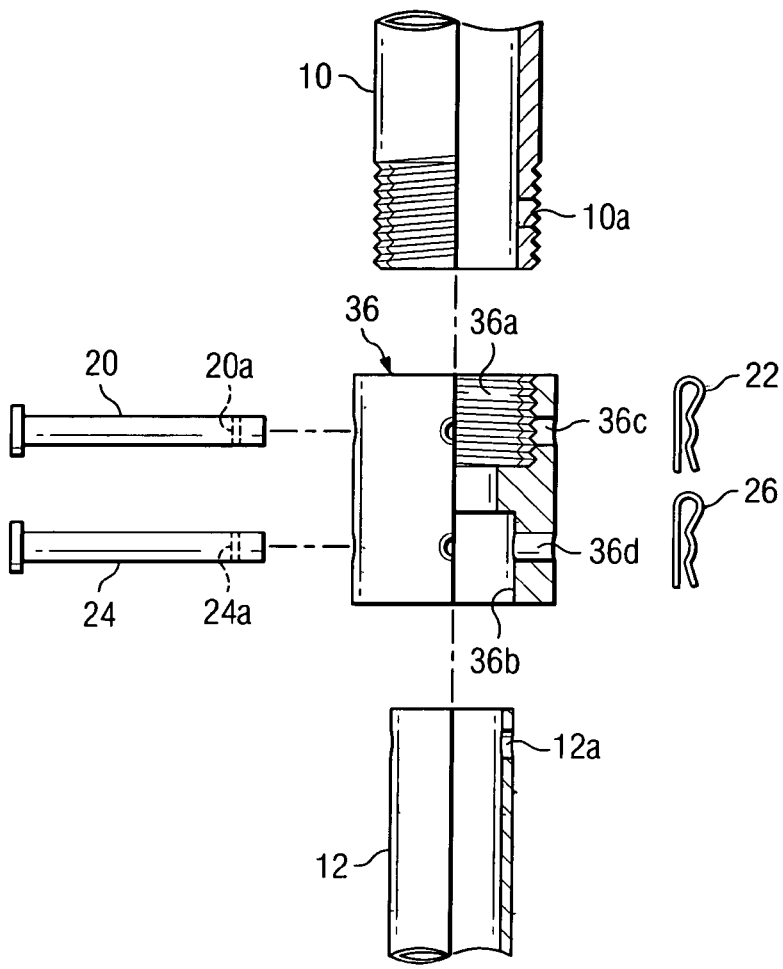
FIG. 9 is an exploded, partial sectional/partial elevational view of an alternate embodiment of the present invention.
Figure 10:
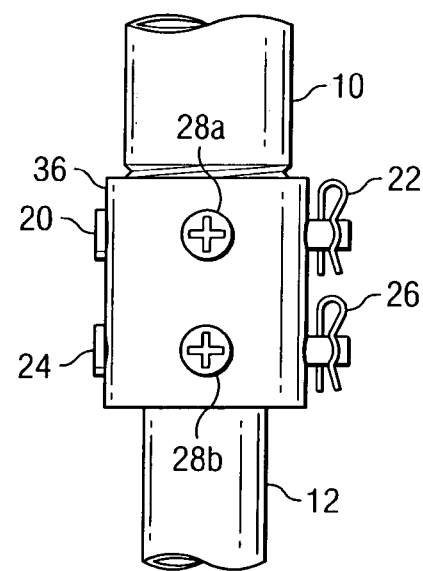
FIG. 10 is an elevational view of the embodiment of FIG. 9, depicting the components of FIG. 9 in an assembled condition.

The embodiment of FIGS. 9 and 10 is similar to that of the previous embodiments, and identical components are given the same reference numerals. For the purposes of this example, it will be assumed that the outer diameter of the downrod 10 is greater than that of the downrod 12 and that the lower end portion of the downrod 10 is externally threaded.

An adapter 36 connects the downrods 10 and 12 and is formed by a solid cylindrical member having two counterbores 36a and 36b formed in its respective ends. The counterbore 36a is internally threaded to receive the externally threaded, lower end portion of the downrod 10.

The wall of the adapter 36 defining the counterbore 36a has two aligned, diametrically opposed, openings extending therethrough, with one of the openings being shown by the reference numeral 36c. Similarly, the wall of the adapter 36 defining the counterbore 36b also has two aligned, diametrically opposed, openings extending therethrough, with one of the openings being shown by the reference numeral 36d.

The diameter of the counterbore 36a of the adapter 36 corresponds to the outer diameter of the downrod 10 so that the lower end portion of the downrod 10 can be threadedly engaged with the internally threaded counterbore 36a by rotating the adapter and the downrod relative to each other. After a sufficient threaded engagement has been established, the relative rotation is continued until the openings 36c align with the openings 10a. The bolt 20 (described in the embodiment of FIGS. 1 and 2) is then inserted in the aligned openings 36c and 10a to lock the downrod 10 to the adapter 36, and the lock pin 22 is inserted through a transverse opening 20a formed in the bolt to retain the bolt in the locking position.

The diameter of the counterbore 36b of the adapter 36 corresponds to the outer diameter of the downrod 12 so that the upper end portion of the downrod 12 can be inserted in the counterbore 36b with minimum clearance. After this insertion, the adapter 36 is rotated relative to the downrod 12 until the openings 36d align with the openings 12a. The bolt 24 is then inserted in the aligned openings 36d and 12a to lock the downrod 12 to the adapter 36, and the lock pin 26 is inserted through a transverse opening 24a formed in the bolt to retain the bolt in the locking position.

As in the previous embodiments, the set screw 28a extends through an opening in the adapter 36, and engages the downrod 10. Also, the set screw 28b extends through another opening in the adapter 36 and engages the downrod 12.

The fixture is connected to the ceiling by the downrods 10 and 12 and the adapter 36 in the same manner as discussed in connection with the embodiment of FIGS. 1 and 2.

Figure 11:
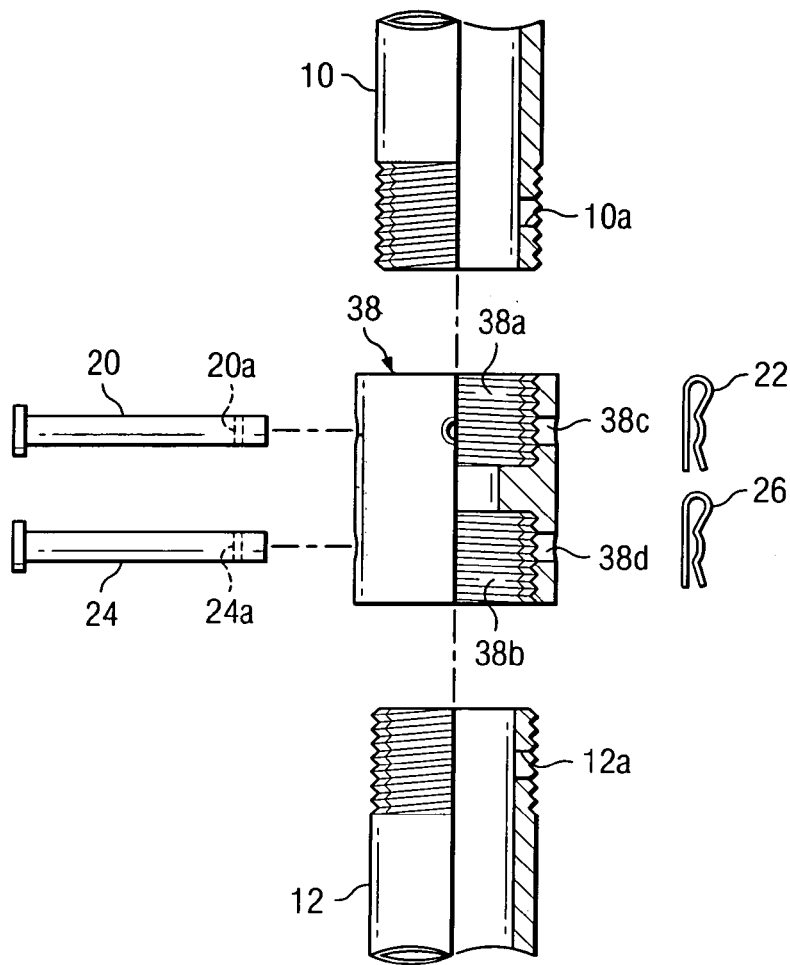
FIG. 11 is an exploded, partial sectional/partial elevational view of an alternate embodiment of the present invention.
Figure 12:
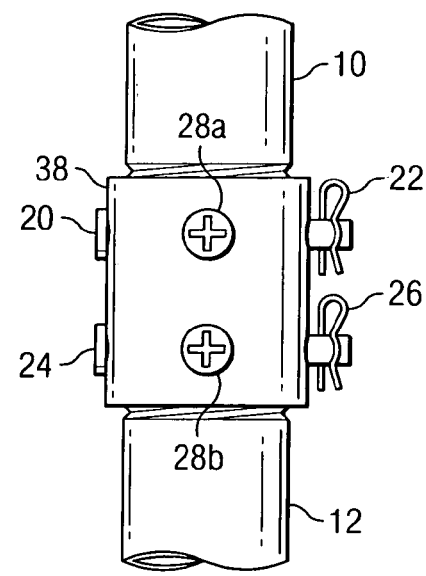
FIG. 12 is an elevational view of the embodiment of FIG. 11, depicting the components of FIG. 11 in an assembled condition.

The embodiment of FIGS. 11 and 12 is similar to that of the previous embodiments, and identical components are given the same reference numerals. For the purposes of this example, it will be assumed that the outer diameter of the downrod 10 is the same as that of the downrod 12, that the lower end portion of the downrod 10 is externally threaded, and that the upper end portion of the downrod 12 is also externally threaded.

An adapter 38 connects the downrods 10 and 12 and is formed by a solid cylindrical member having two counterbores 38a and 38b formed in its respective ends. The counterbores 38a and 38b are internally threaded to receive the externally threaded, lower end portion of the downrods 10 and 12, respectively.

The wall of the adapter 38 defining the counterbore 38a has two aligned, diametrically opposed, openings extending therethrough, with one of the openings being shown by the reference numeral 38c. Similarly, the wall of the adapter 38 defining the counterbore 38b also has two aligned, diametrically opposed, openings extending therethrough, with one of the openings being shown by the reference numeral 38d.

The diameter of the counterbore 38a of the adapter 38 corresponds to the outer diameter of the downrod 10 so that the lower end portion of the downrod 10 can be threadedly engaged with the internally threaded counterbore 38a by rotating the adapter and the downrod relative to each other. After a sufficient threaded engagement has been established, the relative rotation is continued until the openings 38c align with the openings 10a. The bolt 20 (described in the embodiment of FIGS. 1 and 2) is then inserted in the aligned openings 38c and 10a to lock the downrod 10 to the adapter 38, and the lock pin 22 is inserted through a transverse opening 20a formed in the bolt to retain the bolt in the locking position.

Similarly, the diameter of the counterbore 38b of the adapter 38 corresponds to the outer diameter of the downrod 12 so that the upper end portion of the downrod 12 can be threadedly engaged with the internally threaded counterbore 38b by rotating the adapter and the downrod relative to each other. After a sufficient threaded engagement has been established, the relative rotation is continued until the openings 38d align with the openings 12a. The bolt 24 is then inserted in the aligned openings 38d and 12a to lock the downrod 12 to the adapter 38, and the lock pin 26 is inserted through a transverse opening 24a formed in the bolt to retain the bolt in the locking position.

As in the previous embodiments, the set screw 28a extends through an opening in the adapter 38, and engages the downrod 10. Also, the set screw 28b extends through another opening in the adapter 38 and engages the downrod 12.

The fixture is connected to the ceiling by the downrods 10 and 12 and the adapter 38 in the same manner as discussed in connection with the embodiment of FIGS. 1 and 2.

Figure 13:
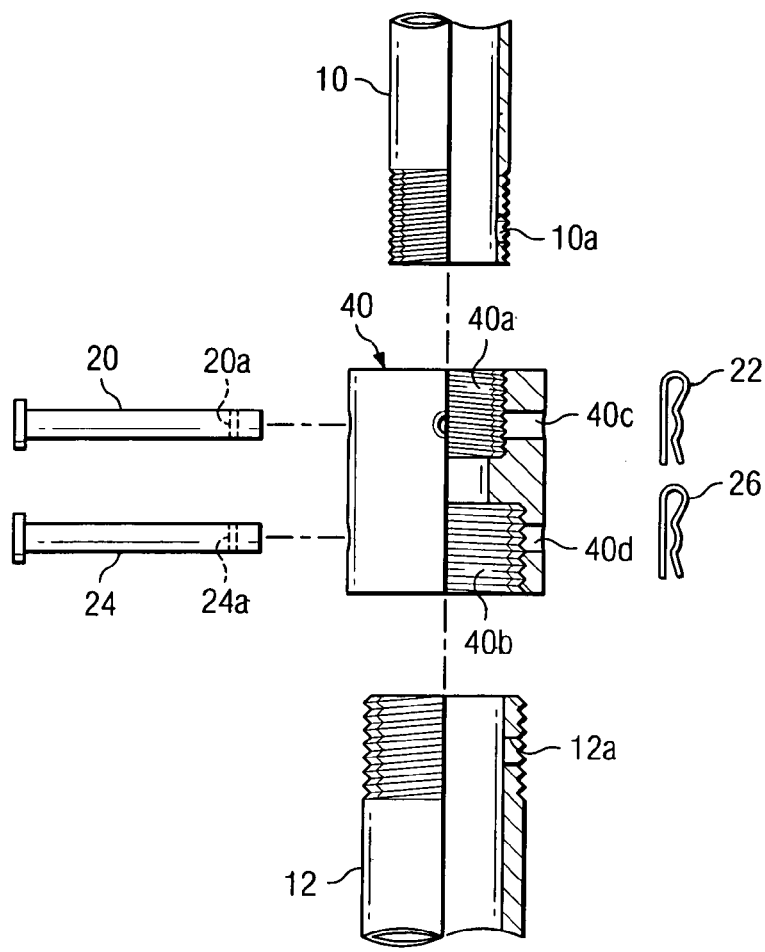
FIG. 13 is an exploded, partial sectional/partial elevational view of an alternate embodiment of the present invention.
Figure 14:
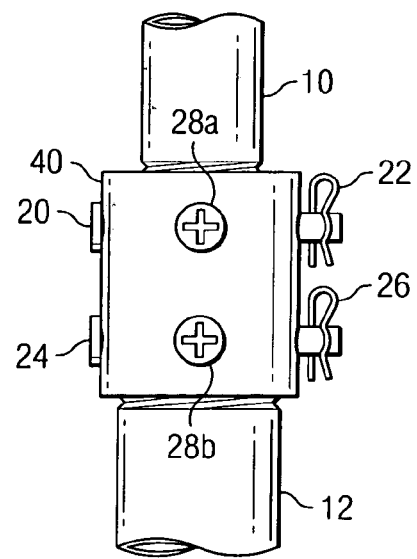
FIG. 14 is an elevational view of the embodiment of FIG. 13, depicting the components of FIG. 13 in an assembled condition.

The embodiment of FIGS. 13 and 14 is similar to that of the previous embodiments, and identical components are given the same reference numerals. For the purposes of this example, it will be assumed that the outer diameter of the downrod 10 is less that of the downrod 12, that the lower end portion of the downrod 10 is externally threaded, and that the upper end portion of the downrod 12 is also externally threaded.

An adapter 40 connects the downrods 10 and 12 and is formed by a solid cylindrical member having two counterbores 40a and 40b formed in its respective ends. The counterbores 40a and 40b are internally threaded to receive the externally threaded, lower end portion of the downrods 10 and 12, respectively.

The wall of the adapter 40 defining the counterbore 40a has two aligned, diametrically opposed, openings extending therethrough, with one of the openings being shown by the reference numeral 40c. Similarly, the wall of the adapter 40 defining the counterbore 40b also has two aligned, diametrically opposed, openings extending therethrough, with one of the openings being shown by the reference numeral 40d.

The diameter of the counterbore 40a of the adapter 40 corresponds to the outer diameter of the downrod 10 so that the lower end portion of the downrod 10 can be threadedly engaged with the internally threaded counterbore 40a by rotating the adapter and the downrod relative to each other. After a sufficient threaded engagement has been established, the relative rotation is continued until the openings 40c align with the openings 10a. The bolt 20 (described in the embodiment of FIGS. 1 and 2) is then inserted in the aligned openings 40c and 10a to lock the downrod 10 to the adapter 40, and the lock pin 22 is inserted through a transverse opening 20a formed in the bolt to retain the bolt in the locking position.

Similarly, the diameter of the counterbore 40b of the adapter 40 corresponds to the outer diameter of the downrod 12 so that the upper end portion of the downrod 12 can be threadedly engaged with the internally threaded counterbore 40b by rotating the adapter and the downrod relative to each other. After a sufficient threaded engagement has been established, the relative rotation is continued until the openings 40d align with the openings 12a. The bolt 24 is then inserted in the aligned openings 40d and 12a to lock the downrod 12 to the adapter 40, and the lock pin 26 is inserted through a transverse opening 24a formed in the bolt to retain the bolt in the locking position.

As in the previous embodiments, the set screw 28a extends through an opening in the adapter 40, and engages the downrod 10. Also, the set screw 28b extends through another opening in the adapter 40 and engages the downrod 12.

The fixture is connected to the ceiling by the downrods 10 and 12 and the adapter 40 in the same manner as discussed in connection with the embodiment of FIGS. 1 and 2.

VARIATIONS

It is understood that several variations may be made in the foregoing without departing from the scope of the invention. For example, the upper end portion of the downrod 12 can be internally threaded while the lower end portion of the downrod 10 is not threaded. Also, the lower end portion of the downrod 10 and/or the upper end portion of the downrod 12 can be internally threaded and the adapters 32, 34, 36, 38, and/or 40 could be configured with external threads to threadedly engage the end portions. Also, the locking bolt 20 could be eliminated in the embodiments of FIGS. 5–14, and the locking bolt 24 could be eliminated in the embodiments of FIGS. 11–14. Further, any combination of threaded configurations and downrod diameter sizes are within the scope of the invention. Moreover, the setscrews 28a and 28b can be eliminated from any of the embodiments.

Although only a few exemplary embodiments have been described in detail above, those skilled in the art will readily appreciate that many other variations and modifications are possible in the exemplary embodiment without materially departing from the novel teachings and advantages of this invention. Accordingly, all such variations and modifications are intended to be included within the scope of this invention as defined in the following claims. In the claims, means-plus-function clauses are intended to cover the structures described herein as performing the recited function and not only structural equivalents, but also equivalent structures.

What is claimed is:

1. Apparatus for mounting a fixture to an electrical terminal in a ceiling, the apparatus comprising:
   a first tubular member connected to the terminal and having a bore for receiving electrical wires extending from the terminal and two diametrically opposed openings in its wall defining the bore;
   a second tubular member extending from the fixture and having a bore for receiving the electrical wires and two diametrically opposed openings in its wall defining the bore;
   an adapter for connecting the tubular members, the adapter comprising:
      a solid cylindrical member having:
         a first counterbore formed in one end portion for receiving the first tubular member,
         a first pair of diametrically opposed openings in the wall portion of the cylindrical member forming the first counterbore;
         a second counterbore formed in the other end portion for receiving the second tubular member;
         a second pair of diametrically opposed openings in the wall portion of the cylindrical member forming the second counterbore;
         a through bore connecting the counterbores for receiving the electrical wires, and
         two additional openings extending perpendicularly to the first and second pair of diametrically opposed openings;
   the diametrically opposed openings in the first tubular member adapted to align with the openings in the wall of the adapter member forming the first counterbore;
   the diametrically opposed openings in the second tubular member adapted to align with the openings in the wall of the adapter forming the second counterbore;
   a first bolt extending through the openings in the first tubular member and the openings in the wall of the adapter forming the first counterbore;

a second bolt extending through the openings in the second tubular member and the openings in the wall of the adapter forming the second counterbore; and two set screws extending through the additional openings, respectively, and engaging the respective tubular members;

the bores of the tubular members and the through bore of the adapter defining a continuous bore through which the wires extend.

2. The apparatus of claim 1 wherein the axes of the set screws extend perpendicularly to the axes of the bolts.

3. The apparatus of claim 1 wherein the diameter of one of the tubular members is greater than the diameter of the other tubular member.

4. The apparatus of claims 1 wherein the respective end portions of the first and second tubular members extend in the first and second counterbores, respectively, with minimum clearance.

5. The apparatus of claim 1 wherein an internally threaded wall is formed in each of said first and second counterbornes and receives the corresponding first and second tubular members in a threaded engagement.

6. The apparatus of claim 1 wherein the diameter of the first tubular member is different from the diameter of the second tubular member.

* * * * *